(12) United States Patent
Son et al.

(10) Patent No.: US 10,637,380 B2
(45) Date of Patent: Apr. 28, 2020

(54) METHOD AND APPARATUS FOR CONTROLLING SAFETY POWER WINDOW

(71) Applicant: DY AUTO Corporation, Asan-si (KR)

(72) Inventors: Dong Hun Son, Asan-si (KR); Bo Sung Jo, Asan-si (KR)

(73) Assignee: DY AUTO Corporation, Asan-si (KR)

( * ) Notice: Subject to any disclaimer, the term of this patent is extended or adjusted under 35 U.S.C. 154(b) by 0 days.

(21) Appl. No.: 16/215,337

(22) Filed: Dec. 10, 2018

(65) Prior Publication Data

US 2019/0253010 A1 Aug. 15, 2019

(30) Foreign Application Priority Data

Feb. 14, 2018 (KR) ........................ 10-2018-0018690

(51) Int. Cl.
| | | |
|---|---|---|
| *H02P 7/03* | (2016.01) | |
| *H02P 7/00* | (2016.01) | |
| *E05F 15/70* | (2015.01) | |
| *H02P 7/18* | (2006.01) | |
| *H02H 7/085* | (2006.01) | |
| *E05F 15/41* | (2015.01) | |

(52) U.S. Cl.
CPC ............ *H02P 7/0094* (2013.01); *E05F 15/41* (2015.01); *E05F 15/70* (2015.01); *H02H 7/0851* (2013.01); *H02P 7/03* (2016.02); *H02P 7/18* (2013.01); *E05Y 2400/54* (2013.01); *E05Y 2900/55* (2013.01)

(58) Field of Classification Search
CPC ...... H02H 7/0851; H02H 7/085; H02H 3/006; H02P 7/0094; H02P 6/10
See application file for complete search history.

(56) References Cited

U.S. PATENT DOCUMENTS

| | | | | |
|---|---|---|---|---|
| 5,539,290 A | * | 7/1996 | Lu ........................ | H02H 7/0851 318/434 |
| 6,144,179 A | | 11/2000 | Kessler et al. | |
| 6,426,604 B1 | | 7/2002 | Ito et al. | |
| 7,449,855 B2 | * | 11/2008 | Kalb .................... | H02H 7/0851 318/283 |
| 7,696,708 B2 | * | 4/2010 | Kurimoto ............. | H02P 7/0094 318/400.23 |
| 8,198,849 B2 | * | 6/2012 | Lamm .................. | H02H 7/0851 318/264 |
| 8,471,553 B2 | | 6/2013 | Tategami | |

FOREIGN PATENT DOCUMENTS

| | | |
|---|---|---|
| JP | 07-082954 | 3/1995 |
| JP | 11-147418 | 6/1999 |
| KR | 10-2016-0133870 A | 11/2016 |

* cited by examiner

*Primary Examiner* — Rina I Duda
(74) *Attorney, Agent, or Firm* — Klarquist Sparkman, LLP (57) ABSTRACT

Provided is a safety power window controlling method including an operation in which a ripple current detector detects a ripple current by removing high-frequency noise from an output current signal of a four-pole stator motor; an operation in which an amplifier receives a ripple current as a first input signal, receives a reference voltage as a second input signal, and outputs an amplified current signal obtained by amplifying the first input signal to a level of the reference voltage; and detecting the amplified current signal output by the amplifier as a valid signal by using at least two preset reference values.

11 Claims, 6 Drawing Sheets

METHOD AND APPARATUS FOR CONTROLLING SAFETY POWER WINDOW

CROSS-REFERENCE TO RELATED APPLICATION

This application claims the benefit of Korean Patent Application No. 10-2018-0018690, filed on Feb. 14, 2018, in the Korean Intellectual Property Office, the disclosure of which is incorporated herein in its entirety by reference.

BACKGROUND

1. Field

One or more embodiments relate to a safety power window controlling apparatus using a four-pole stator motor.

2. Description of the Related Art

Generally, a vehicle has a mechanism by which a safety window system controls a glass window to automatically open when an obstacle is detected while the glass window is automatically rising. To realize such a function, a component like a Hall IC is used. However, when a component such as a Hall IC is broken, the mechanism does not function properly.

To solve such a problem, a method of detecting a ripple current component in a motor current, amplifying the detected ripple current, and detecting a desired revolution number pulse waveform through a comparator is used.

When a two-pole stator motor is used, regular ripple is generated, and thus a pulse drop phenomenon does not occur. However, when a four-pole stator motor is used, ripples are generated irregularly, and thus it is difficult to detect a desired pulse waveform. Particularly, there is a problem in that irregular ripples are generated in a structure in which brushes are arranged at intervals of 90 degrees, and thus pulses are missed.

(Patent Literature 1) U.S. Pat. No. 6,144,179

SUMMARY

One or more embodiments include prevention of missing pulses by regularly detecting ripples even when using a four-pole stator motor.

Additional aspects will be set forth in part in the description which follows and, in part, will be apparent from the description, or may be learned by practice of the presented embodiments.

According to one or more embodiments, a safety power window controlling apparatus includes a ripple current detector configured to detect a ripple current by removing high-frequency noise from an output current signal of a four-pole stator motor; an amplifier configured to receive a ripple current as a first input signal, receive a reference voltage as a second input signal, and output an amplified current signal obtained by amplifying the first input signal to a level of the reference voltage; a first reference unit configured to set, as a first reference value, the median value between a maximum value $I_{P\_Pmax}$ of an amplified current signal output by the amplifier and a measured value $I_{RMS\_measure}$ of an average current value of the amplified current signal; a second reference unit configured to set, as a second reference value, the median value between an amplified current signal value $I_{3seg}$ and a theoretical value $I_{RMS\_theory}$ of the average current value of the amplified current signal; and a valid signal detector configured to detect the amplified current signal as a valid signal when the amplified current signal exceeds both the first reference value and the second reference value.

The apparatus may further include a valid signal detector configured to generate a pulse signal that outputs 1 as the value of a valid signal when the first reference value and the second reference value are both exceeded and outputs 0 as the value of a valid signal when neither the first reference value nor the second reference value is satisfied.

The revolution calculator may calculate the number of revolutions of the four-pole stator motor based on a period of the pulse signal corresponding to a drop signal of the amplifier current signal value.

The apparatus may further include a motor controller configured to control a driving direction of the motor based on the number of revolutions of the motor calculated by the revolution calculator.

When the number of revolutions of the motor calculated by the revolution calculator during the period of the pulse signal is greater than a preset reference value, the motor controller may control a glass window of a vehicle to open by pulling down (AUTO DOWN) the glass window of the vehicle that is automatically rising, by controlling the driving direction of the motor, and, when the number of revolutions of the motor calculated by the revolution calculator during the period of the pulse signal is lower than the preset reference value, the motor controller may control the driving direction of the motor such that the window glass automatically rises.

According to one or more embodiments, a safety power window controlling method includes an operation in which a ripple current detector detects a ripple current by removing high-frequency noise from an output current signal of a four-pole stator motor; an operation in which an amplifier receives a ripple current as a first input signal, receives a reference voltage as a second input signal, and outputs an amplified current signal obtained by amplifying the first input signal to a level of the reference voltage; setting, as a first reference value, the median value between a maximum value $I_{P\_Pmax}$ of an amplified current signal output by the amplifier and a measured value $I_{RMS\_measure}$ of an average current value of the amplified current signal; setting, as a second reference value, the median value between an amplified current signal value $I_{3seg}$ and a theoretical value $I_{RMS\_theory}$ of the average current value of the amplified current signal; and an operation in which a valid signal detector detects the amplified current signal as a valid signal when the amplified current signal exceeds both the first reference value and the second reference value.

According to one or more embodiments, a safety power window controlling method includes an operation in which a ripple current detector detects a ripple current by removing high-frequency noise from an output current signal of a four-pole stator motor; an operation in which an amplifier receives a ripple current as a first input signal, receives a reference voltage as a second input signal, and outputs an amplified current signal obtained by amplifying the first input signal to a level of the reference voltage; and detecting the amplified current signal output by the amplifier as a valid signal by using at least two preset reference values.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present disclosure may include various embodiments and modifications, and embodiments thereof will be illustrated in the drawings and will be described herein in detail. The effects and features of the present disclosure and the accompanying methods thereof will become apparent from the following description of the embodiments, taken in conjunction with the accompanying drawings. However, the present disclosure is not limited to the embodiments described below, and may be embodied in various modes.

Reference will now be made in detail to embodiments, examples of which are illustrated in the accompanying drawings. In the drawings, the same elements are denoted by the same reference numerals, and a repeated explanation thereof will not be given.

Figure 1:
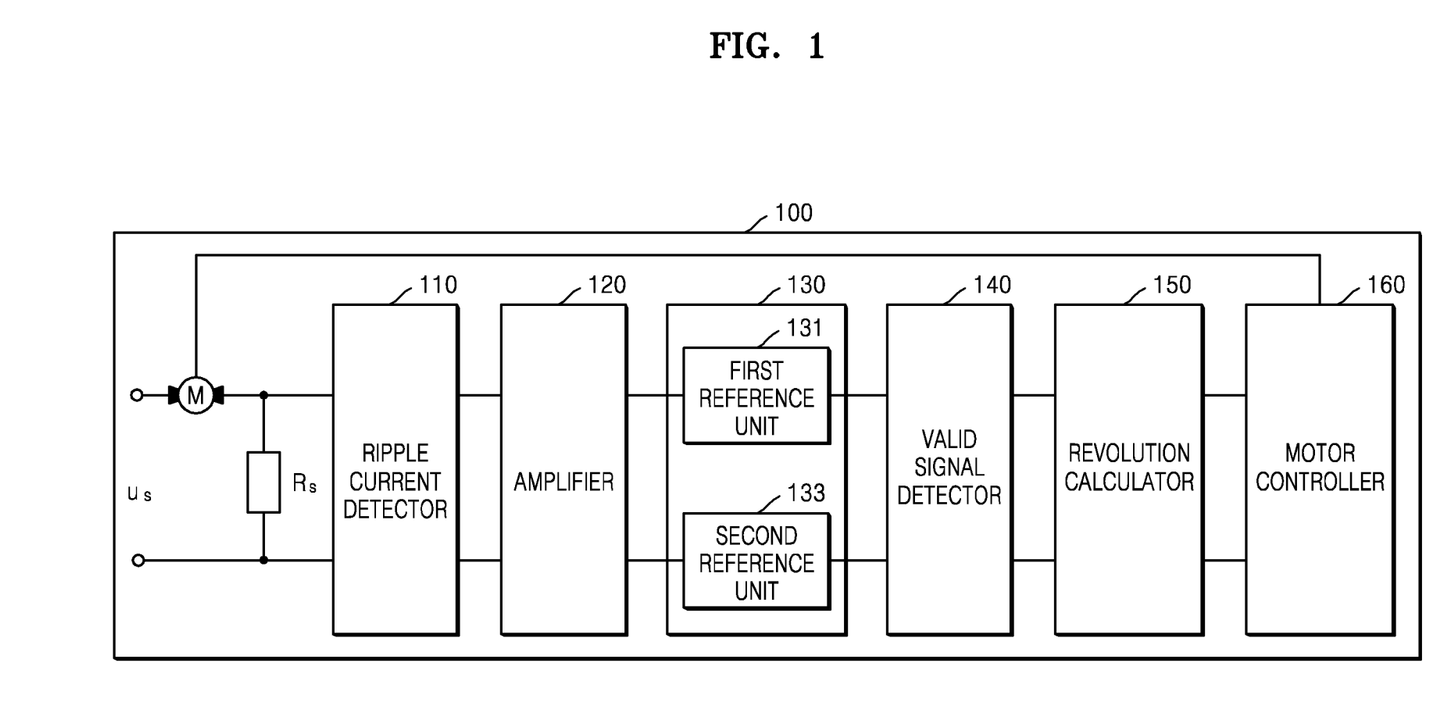
FIG. 1 is a block diagram of an internal configuration of a safety power window controlling apparatus according to one or more embodiments.

FIG. 1 is a block diagram of an internal configuration of a safety power window controlling apparatus 100 according to one or more embodiments. The safety power window controlling apparatus 100 includes a ripple current detector 110, an amplifier 120, a first reference unit 131, a second reference unit 133, a valid signal detector 140, a revolution calculator 150, and a motor controller 160.

The ripple current detector 110 detects a ripple current IR by removing high frequency noise from an output current signal IM of the motor 101. The safety power window controlling apparatus 100 according to one or more embodiments is limited to the case of using a four-pole direct current (DC) motor employing four permanent magnets. In this case, the ripple current detector 110 detects a ripple current by removing high frequency noise from an output current signal of a four-pole stator motor.

According to one or more embodiments, a motor includes a stator and a rotor. The stator includes four permanent magnets (not shown), and brushes are arranged in an annular shape at intervals of 90 degrees. The rotor is configured to rotate by electromagnetic interaction with the stator. An example of the rotor is an armature.

According to one or more embodiments, a quadrupole DC motor may include N slots. In one embodiment, as in the embodiment of FIG. 3, when N=10, 10 slots are arranged in an annular shape at intervals of 36 degrees, and thus the 10 slots are arranged at positions corresponding to 0°, 36°, 72°, and so on, respectively. In this case, as in the example shown in FIG. 3, the number of slots contacted by the armature may vary according to by the revolution of the armature, and thus a ripple current is generated.

The amplifier 120 receives a ripple current as a first input signal, receives a reference voltage Vref as a second input signal, and outputs an amplified current signal obtained by amplifying the first input signal to the level of the reference voltage Vref.

According to one or more embodiments, a quadrupole DC motor is used. Therefore, as indicated by five examples 310, 320, 330, 340, and 350 shown in FIG. 3, while the armature of the motor is rotating, an irregular pattern occurs, e.g., the armature contacts three slots or two slots. In this case, the magnitude of a resistance $R_{t3seg}$, which is generated when the armature contacts three slots, is different from the magnitude of a resistance $R_{t2seg}$, which is generated when the armature contacts two slots. Therefore, an irregular ripple is generated as shown in the example of FIG. 4. The amplified current signal from the amplifier 120 appears as an example in FIG. 4.

Figure 3:
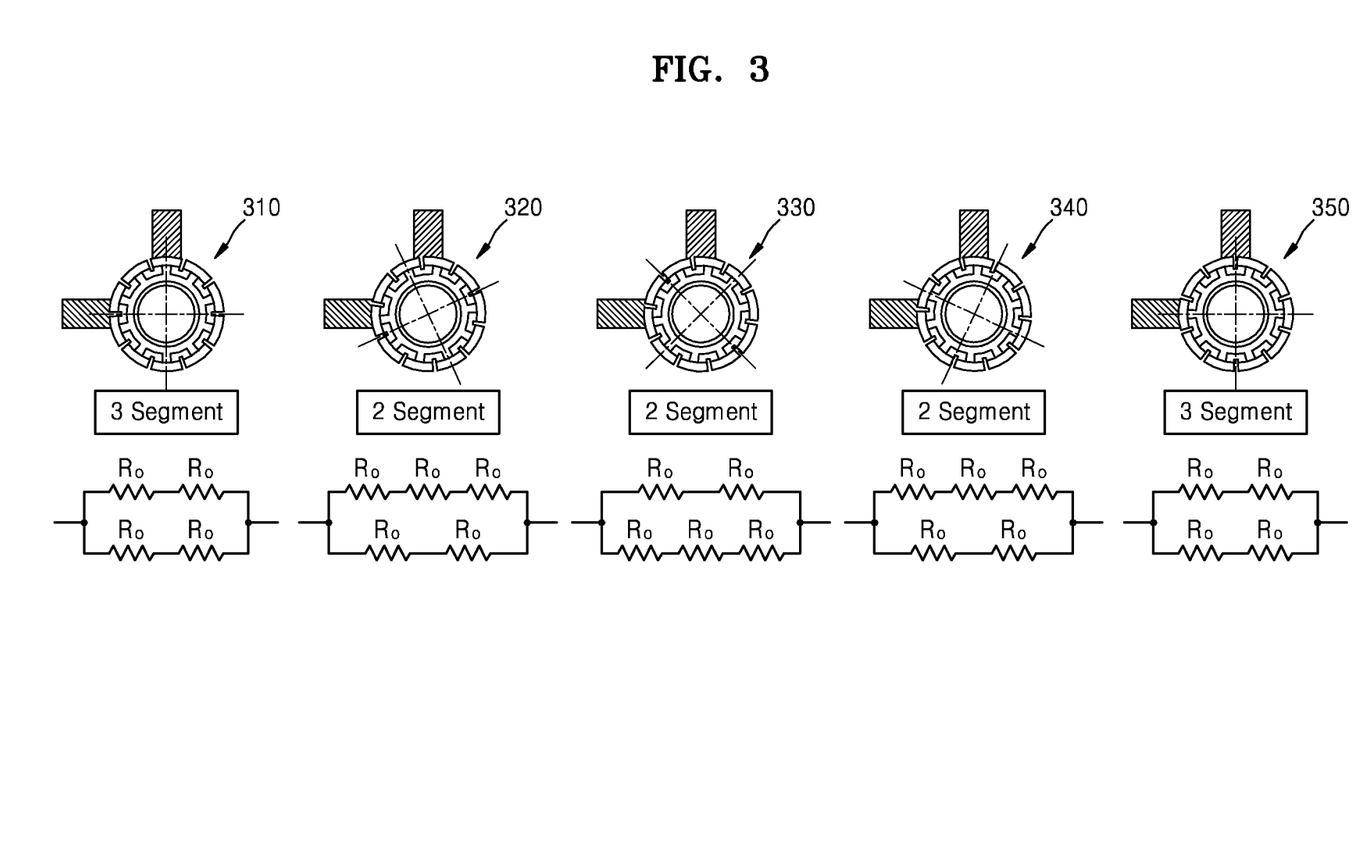
FIG. 3 is a diagram showing an example in which a resistance varies irregularly when a quadrupole motor is used in a safety power window controlling apparatus and fluctuation of a ripple current is significant.
Figure 4:
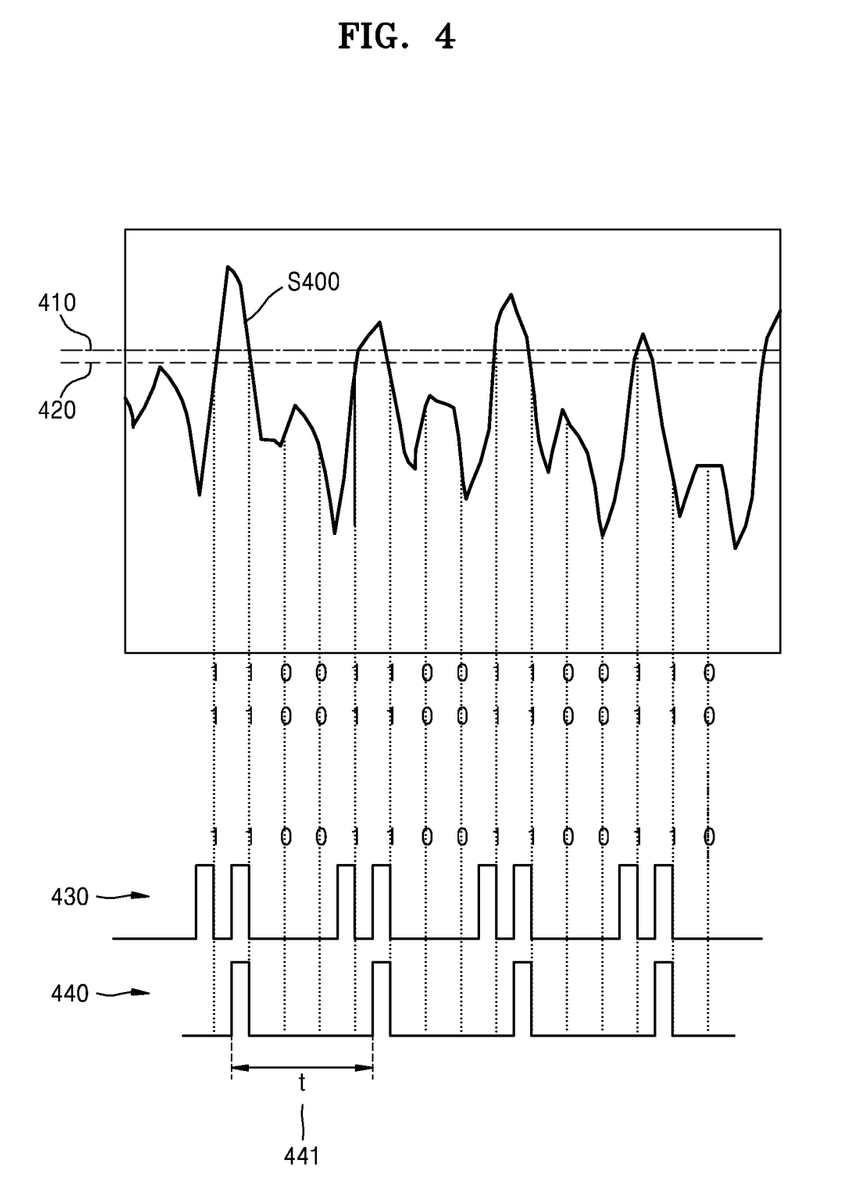
FIG. 4 is a diagram showing an example in which a regular pulse signal is detected by stably controlling irregular ripples generated when a quadrupole motor is used, according to one or more embodiments.

Referring to FIG. 3, in cases 310 and 350 where the armature of the motor revolves and contacts three slots, the resistance $R_{t3seg}$ and a current $I_{3seg}$ are as follows.

$$R_{t3seg}=½R_0+½R_0=1/R_o, R_{t3seg}=R_o$$

$I_{3seg}=(V-V_B-(K_E*N))/R_{t3seg}$, where V denotes an input voltage, $V_B$ denotes a brush voltage drop, $K_E$ denotes an induced voltage constant, and N denotes rpm.

Referring to FIG. 3, in cases 320, 330, and 340 where the armature of the motor revolves and contacts two slots, the resistance $R_{t2seg}$ and a current $I_{2seg}$ are as follows.

$$R_{t2seg}=⅓R_0+½R_0=⅚R_o, R_{t2seg}=1.2R_o$$

$I_{2seg}=(V-V_B-(K_E*N))/R_{t2seg}$, where V denotes an input voltage, $V_B$ denotes a brush voltage drop, $K_E$ denotes an induced voltage constant, and N denotes rpm.

A theoretical value $I_{RMS\_theory}$ of an average current value of the amplified current signal is as follows.

$$I_{RMS\_theory}=((5*I_{3seg})+(12*I_{2seg}))/17$$

Figure 2:
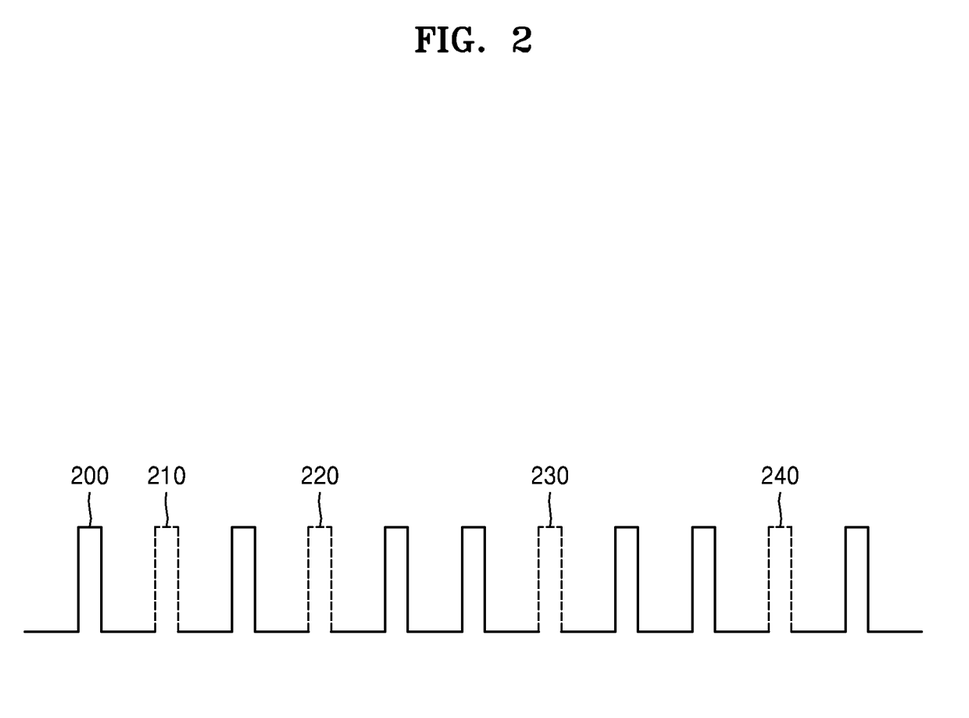
FIG. 2 is a diagram showing an example of a problem in which a pulse is missed when a quadrupole motor is used in a safety power window controlling apparatus.

In case of using a quadrupole motor, as shown in the above equation, when the armature of the quadrupole motor contacts three slots while the armature is revolving, a relatively small resistance is generated. On the other hand, when the armature of the quadrupole motor contacts two slots while the armature is revolving, a relatively large resistance is generated. Therefore, as shown in FIG. 4, irregular ripples may be generated in the amplified current signal as shown in FIG. 4, and thus a phenomenon that pulses are missed (refer to FIGS. 2; 210, 220, 230, and 240) may occur due to irregular resistance.

According to one or more embodiments, to prevent pulses from being missed in a quadrupole motor, pulses may be irregularly extracted from the amplified current signal shown in FIG. 4 by using at least two reference values.

Additionally referring to FIG. 4, the first reference unit 131 sets the median value between a maximum value $I_{P\_Pmax}$ of an amplified current signal S400 output from the amplifier 120 and a measured value $I_{RMS\_measure}$ of an average current value of the amplified current signal S400 as a first reference value 410.

The second reference unit 133 sets the median value between an amplified current signal value $I_{3seg}$ obtained by amplifying a 3-segment current value of a four-pole stator motor from the amplified current signal value and the theoretical value $I_{RMS\_theory}$ of an average current value of the amplified current signal as a second reference value 420.

The valid signal detector 140 detects the amplified current signal as a valid signal when both the first reference value 410 and the second reference value 420 are exceeded. Referring to FIG. 4, a case where the first reference value 410 is satisfied is indicated by 1, whereas a case where the first reference value 410 is not satisfied is indicated by 0. In the same regard, a case where the second reference value 420 is satisfied is indicated by 1, whereas a case where the second reference value 420 is not satisfied is indicated by 0.

Referring to the graph of FIG. 4, the valid signal detector 140 extracts the amplified current signal as "1 1 0 0 1 1 0 0 1 1 0 0 1 1 0" based on the first reference value 410. In the same regard, the amplified current signal is extracted as "1 1 0 0 1 1 0 0 1 1 0 0 1 1 0" based on the second reference value 420.

The valid signal detector 140 detects the amplified current signal as a valid signal when both the first reference value 410 and the second reference value 420 are satisfied. A pulse signal that outputs 1 as the value of the valid signal when the first reference value and the second reference value are both exceeded and outputs 0 as the value of the valid signal when neither the first reference value nor the second reference value is satisfied is generated. In this case, referring to FIG. 4, two pulse signals including a first pulse signal 430 and a second pulse signal 440 may be detected.

The first pulse signal 430 represents a waveform in case where both the rising edge and the falling edge of the amplified current signal are detected, and the second pulse signal 440 represents a waveform in case where only the falling edge of the amplified current signal is detected. The first pulse signal 430 or the second pulse signal 440 may be used as needed. According to one or more embodiments, the revolution calculator 150 may use the second pulse signal 440 to calculate a period t 441 and determine the number of revolutions of the motor.

According to one or more embodiments, the motor controller 160 controls the driving direction of the motor based on the number of revolutions of the motor calculated by the revolution calculator 150. When the number of revolutions of the motor calculated by the revolution calculator 150 during the period of a pulse signal is greater than a preset reference value, the motor controller 160 controls the driving direction of the motor so that a window glass of a vehicle is automatically lowered (AUTO DOWN). On the other hand, when the number of revolutions of the motor calculated by the revolution calculator 150 during the period of a pulse signal is smaller than the preset reference value, the motor controller 160 controls the driving direction of the motor so that the window glass of the vehicle automatically rises.

Figure 5:
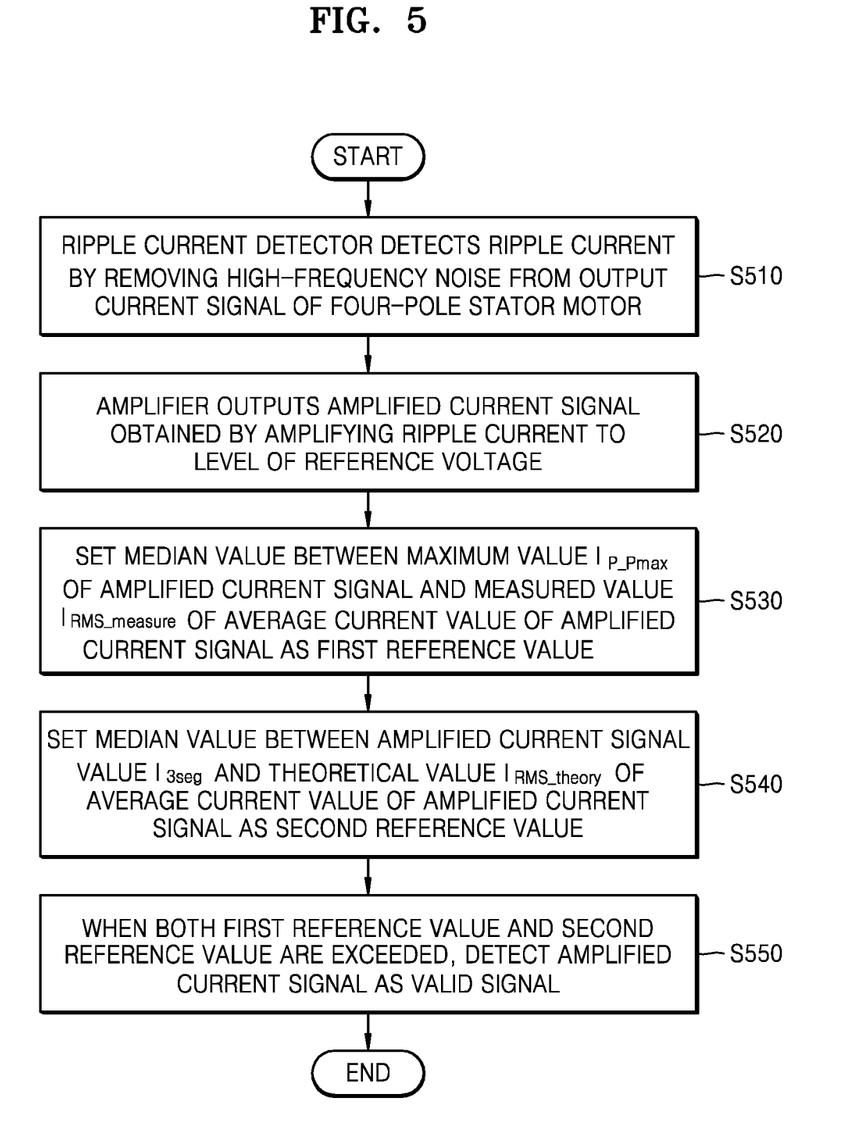
FIGS. 5 and 6 are flowcharts of methods of controlling a safety power window according to one or more embodiments.

FIG. 5 is a flowchart of a method of controlling a safety power window according to one or more embodiments.

A ripple current detector detects a ripple current by removing the high frequency noise from an output current signal of a four-pole stator motor (operation S510). Next, an amplifier outputs an amplified current signal obtained by amplifying the ripple current to the level of a reference voltage level (operation S520).

According to one or more embodiments, the median value between a maximum value $I_{P\_Pmax}$ of the amplified current signal and a measured value $I_{RMS\_measure}$ of an average current value of the amplified current signal is set as a first reference value (operation S530), and the median value between an amplified current signal value $I_{3seg}$ and a theoretical value $I_{RMS\_theory}$ of the average current value of the signal is set as a second reference value (operation S540).

A valid signal detector detects the amplified current signal as a valid signal when both the first reference value and the second reference value are exceeded (operation S550). Therefore, a highly reliable pulse signal may be detected even when irregular ripples are generated in a structure in which brushes are arranged at intervals of 90 degrees.

Figure 6:
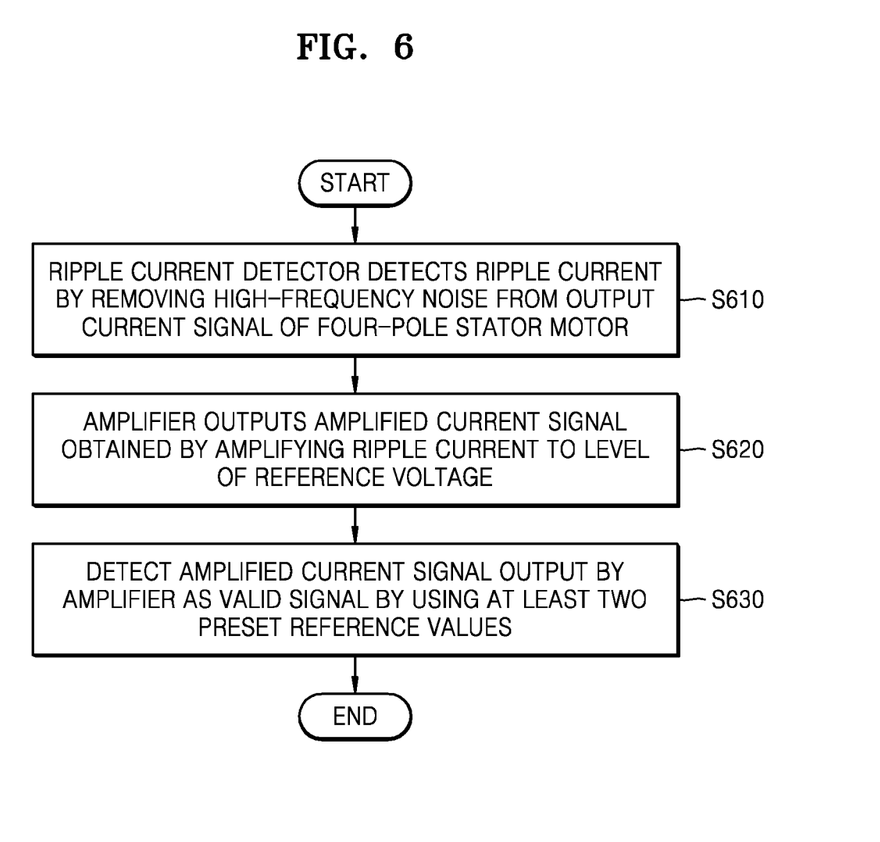

FIG. 6 is a flowchart of another method of controlling a safety power window according to one or more embodiments.

A ripple current detector detects a ripple current by removing the high frequency noise from an output current signal of a four-pole stator motor (operation S610), and an amplifier outputs an amplified current signal obtained by amplifying the ripple current to the level of a reference voltage level (operation S620).

According to one or more embodiments, a valid signal detector detects the amplified current signal output from the amplifier as a valid signal based on at least two preset reference values.

In one embodiment, the valid signal detector may utilize three reference values. A first reference value may be set to the smallest value from among the maximum current values of amplified currents signal and a second reference value may be set to an average value of amplified current signals, that is, an average value of amplified current signals generated when the rotor revolves once. A third reference value may be set to the second reference value—½ (first reference value-second reference value).

In another embodiment, the valid signal detector may use more than two reference values. The median value between the maximum value $I_{P\_Pmax}$ of amplified current signals and the measured value $I_{RMS\_measure}$ of an average current value of the amplified current signals may be set as a first reference value and the median value between an amplified current signal value $I_{3seg}$ and the theoretical value $I_{RMS\_theory}$ of the average current value of the amplified current signals may be set as a second reference value, and the smallest value of the maximum current values of the amplified current signals may be set as a third reference value.

According to one or more embodiments, a safety power window system is capable of extracting pulse signals in a stable and controllable range even when a quadrupole motor is used.

According to one or more embodiments, the safety power window system is capable of eliminating the problem of missing pulses due to ripples generated irregularly at an angle of 90 degrees.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A safety power window controlling apparatus comprising:
   a ripple current detector configured to detect a ripple current by removing high-frequency noise from an output current signal of a four-pole stator motor;
   an amplifier configured to receive a ripple current as a first input signal, receive a reference voltage as a second input signal, and output an amplified current signal obtained by amplifying the first input signal to a level of the reference voltage;
   a first reference unit configured to set, as a first reference value, the median value between a maximum value $I_{P\_Pmax}$ of an amplified current signal output by the amplifier and a measured value $I_{RMS\_measure}$ of an average current value of the amplified current signal;
   a second reference unit configured to set, as a second reference value, the median value between an amplified current signal value $I_{3seg}$, which is obtained by amplifying a 3 segment current value of the four-pole stator motor from among the amplified current signals, and a theoretical value $I_{RMS\_theory}$ of the average current value of the amplified current signal; and
   a valid signal detector configured to detect the amplified current signal as a valid signal when the amplified current signal exceeds both the first reference value and the second reference value.

2. The apparatus of claim 1, wherein the valid signal detector is further configured to generate a pulse signal that outputs 1 as the value of a valid signal when the amplified current signal exceeds both of the first reference value and the second reference value and outputs 0 as the value of a valid signal when neither the first reference value nor the second reference value is satisfied.

3. The apparatus of claim 2, further comprising:
   a revolution calculator configured to calculate the number of revolutions of the four-pole stator motor based on a period of the pulse signal corresponding to a drop signal of the amplified current signal value.

4. The apparatus of claim 3, further comprising:
   a motor controller configured to control a driving direction of the motor based on the number of revolutions of the motor calculated by the revolution calculator.

5. The apparatus of claim 4, wherein,
   when the number of revolutions of the motor calculated by the revolution calculator during the period of the pulse signal is greater than a preset reference value, the motor controller controls a glass window of a vehicle to open by pulling down (AUTO DOWN) the glass window that is automatically rising, by controlling the driving direction of the motor, and,
   when the number of revolutions of the motor calculated by the revolution calculator during the period of the pulse signal is lower than the preset reference value, the motor controller controls the driving direction of the motor such that the glass window automatically rises.

6. A safety power window controlling method comprising:
   detecting a ripple current by removing high-frequency noise from an output current signal of a four-pole stator motor, the detecting being performed by a ripple current detector;
   receiving a ripple current as a first input signal, receives a reference voltage as a second input signal, and outputs an amplified current signal obtained by amplifying the first input signal to a level of the reference voltage, the receiving being performed by an amplifier;
   setting, as a first reference value, the median value between a maximum value $I_{P\_Pmax}$ of an amplified current signal output by the amplifier and a measured value $I_{RMS\_measure}$ of an average current value of the amplified current signal;
   setting, as a second reference value, the median value between an amplified current signal value $I_{3seg}$ and a theoretical value $I_{RMS\_theory}$ of the average current value of the amplified current signal; and
   detecting the amplified current signal as a valid signal when the amplified current signal exceeds both the first reference value and the second reference value, the detecting being performed by a valid signal detector.

7. The method of claim 6, further comprising:
   generating a pulse signal that outputs 1 as the value of a valid signal when the first reference value and the second reference value are both exceeded and outputs 0 as the value of a valid signal when neither the first reference value nor the second reference value is satisfied, the generating being performed by the valid signal detector.

8. The method of claim 7, wherein the number of revolutions of the four-pole stator motor is calculated based on a period of the pulse signal, and a driving direction of the motor is controlled based on the number of revolutions of the motor calculated by the revolution calculator.

9. A safety power window controlling method comprising:
   detecting a ripple current by removing high-frequency noise from an output current signal of a four-pole stator motor, the detecting being performed by a ripple current detector;
   receiving a ripple current as a first input signal, receives a reference voltage as a second input signal, and outputs an amplified current signal obtained by amplifying the first input signal to a level of the reference voltage, the receiving being performed by an amplifier; and
   detecting the amplified current signal output by the amplifier as a valid signal by using at least two preset reference values.

10. The method of claim 9, further comprising:
    generating a pulse signal that outputs 1 as the value of a valid signal when both of the two preset reference values are exceeded and, when at least one of the two preset reference values are not exceeded, outputs 0 as the value of a valid signal, the generating being performed by the valid signal detector.

11. The method of claim 10, wherein the number of revolutions of the four-pole stator motor is calculated based on a period of the pulse signal, and a driving direction of the motor is controlled based on the number of revolutions of the motor calculated by the revolution calculator.

* * * * *